United States Patent
Noda et al.

(10) Patent No.: US 6,507,566 B1
(45) Date of Patent: Jan. 14, 2003

(54) MOBILE COMMUNICATION DEVICE, MOBILE DATA COMMUNICATION METHOD, AND RECORDING MEDIUM

(75) Inventors: Chie Noda, Yokohama (JP); Hiroyuki Hattori, Yokohama (JP); Tadao Takami, Yokosuka (JP); Ichiro Okajima, Gyouda (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/117,910

(22) PCT Filed: Dec. 9, 1997

(86) PCT No.: PCT/JP97/04520
§ 371 (c)(1),
(2), (4) Date: Aug. 10, 1998

(87) PCT Pub. No.: WO98/26557
PCT Pub. Date: Jun. 18, 1998

(30) Foreign Application Priority Data

Dec. 10, 1996 (JP) .............................. 8-329966

(51) Int. Cl.[7] .......................... H04B 7/00; H04M 1/00; H04N 1/32
(52) U.S. Cl. ...................... 370/310; 370/469; 455/557; 455/574; 358/426.1
(58) Field of Search ................. 370/351–356, 370/311, 328, 338, 400, 401–402, 474, 466, 469, 468, 503, 505, 506, 511, 513; 340/7.32; 455/557, 556, 522, 574; 375/340, 354, 365, 366, 368, 369, 370; 358/425, 426.01, 426.1, 438, 435

(56) References Cited

U.S. PATENT DOCUMENTS 5,446,736 A * 8/1995 Gleeson et al. ............ 370/474
5,463,477 A * 10/1995 Kakizaki .................... 455/557
5,506,834 A    4/1996 Sekihata et al.
5,586,273 A * 12/1996 Blair et al. ................. 370/466
5,638,384 A    6/1997 Hayashi et al.
5,682,417 A   10/1997 Nitta
5,732,074 A *  3/1998 Spaur et al. ................ 455/457
5,841,764 A * 11/1998 Roderique et al. ......... 370/469

FOREIGN PATENT DOCUMENTS

| JP | 56-172048 | 5/1981 |
| JP | 58-21964 A | 2/1983 |
| JP | 61-29240 A | 2/1986 |
| JP | 61-125257 | 6/1986 |

(List continued on next page.)

*Primary Examiner*—Steven Nguyen
(74) *Attorney, Agent, or Firm*—Brinks Hofer Gilson & Lione

(57) ABSTRACT

In a mobile communication system, the PAD of the data-processing-terminal-interface has a packet assembling/disassembling function for the protocol for data-link layer A and the protocol for data-link layer B. The protocol for data-link layer A of the data processing terminal prescribes that a frame, in which data transferred from the upper layer is inserted between flag sequences with a prescribed bit pattern, be transmitted usually, and that flag sequences without data transmission be transmitted when there is no data requiring transmission during communication. If flag sequences are transferred from the data processing terminal, the PAD deletes a part or all of the flag sequences and does not transfer them to the wireless communication unit. Consequently, a part or all of the flag sequences are not transmitted to the wireless communication channel. Therefore, power consumption by a wireless mobile station device or the like may be reduced, and the wireless channel may effectively used.

20 Claims, 14 Drawing Sheets

FOREIGN PATENT DOCUMENTS

| | | |
|---|---|---|
| JP | 61-140239 A | 6/1986 |
| JP | 63-250936 A | 10/1988 |
| JP | 1-168137 A | 7/1989 |
| JP | 1-168137 | 7/1989 |
| JP | 2-252343 | 10/1990 |
| JP | 4-213259 | 8/1992 |
| JP | 7-154430 | 6/1995 |
| JP | 7-112298 B2 | 11/1995 |
| JP | 07-327001 | 12/1995 |
| JP | 8-125801 A | 5/1996 |
| JP | 3233472 | 9/2001 |
| WO | 9621984 * 7/1996 ........... H12L/12/56 |

* cited by examiner

FIG. 17

| SEVENTH LAYER | APPLICATION LAYER |
|---|---|
| SIXTH LAYER | PRESENTATION LAYER |
| FIFTH LAYER | SESSION LAYER |
| FOURTH LAYER | TRANSPORT LAYER |
| THIRD LAYER | NETWORK LAYER |
| SECOND LAYER | DATA-LINK LAYER |
| FIRST LAYER | PHYSICAL LAYER |

21

MOBILE COMMUNICATION DEVICE, MOBILE DATA COMMUNICATION METHOD, AND RECORDING MEDIUM

TECHNICAL FIELD

The present invention relates to mobile data communication, and more specifically, to a mobile communication device and a method for mobile data communication which are suitably employed in the beneficial utilization of a wireless communication channel. The technique, device and method also reduce power consumption in wireless communication units. The present invention also relates to a storage medium wherein a program for executing the method is stored.

TECHNICAL BACKGROUND

A typical data-communication mobile station device used for mobile data communication systems has the structure shown in FIG. 15. In FIG. 15, data processing terminal 11 is, for example, a computer in which an application is processed. Wireless communication unit 12 is, for example, a wireless mobile station device which can transmit data via a wireless channel. As shown in FIG. 16, there is another type of data-communication mobile station device, in which data processing terminal 11 is connected with a wireless communication unit 12 via a data-processing-terminal-interface 13, which functions as an adapter or interface for data transformation between data processing terminal 11 and wireless communication unit 12.

FIG. 17 represents the reference model for OSI (open systems interconnection). FIG. 18 represents a frame format transmitted and received in the HDLC (high-level data link control) protocol. HDLC is the usual communication protocol used between data-link layers 21 in the OSI reference model devices shown in FIG. 17. HDLC is a widely-used protocol; e.g., the point to point protocol (PPP) complies with HDLC. As may be clearly understood from FIG. 18, a transmitting device, in which data processing terminal 11 is accommodated to HDLC, forms a frame such that data for transmission is inserted between two fields of flag sequence 31 having a prescribed bit pattern. The transmitting device then transmits the formed frame, thereby sending the subject data. Flag sequences 31 may be used as a signal to synchronize the frame operations of the transmitting device and the receiving device; i.e., the receiving device, in which data processing terminal 11 is adapted to HDLC, detects flag sequence fields 31, thereby recognizing the beginning and end of the frame. Furthermore, in accordance with HDLC, when a series of frames is transmitted continuously, at least one of flag sequences 31 may denote the end of one frame and the beginning of the next frame.

As mentioned above, in HDLC, flag sequences 31 are detected for synchronous frame operations. Consequently, it is possible to supervise whether the wireless link according to HDLC is maintained or not. Therefore, it is possible to prepare an application which monitors the link establishment, and an application in which the process changes due to the link condition, e.g., an application which ends in response to recognition that the link has been disconnected. Accordingly, the HDLC protocol prescribes that the transmitting device should transmit flag sequences periodically in order to prevent the receiving device's application from carrying out an undesirable operation when the interval between the frames from the transmitted device is too long (hereinafter, this type of interval is referred to as "inter-frame time"). In other words, a plurality of flag sequences 33 are transmitted as inter-frame-time fills in HDLC as represented in FIG. 19.

A system wherein the frames and flag sequences 33 are transmitted independently to the wireless channel is possible. However, the data-link layer of wireless communication unit 12, which is linked to the data-link layer of data processing terminal 11, is usually adapted to a protocol which requires wireless communication unit 12 to form a frame such that any data from data processing terminal 11 is inserted between the flag sequences having a prescribed bit pattern, and the frame is transmitted to the wireless channel. Therefore, not only the usual data, but flag sequences 33 are also loaded in the information field of the frame in such a protocol, and then are transmitted to the wireless channel.

For example, under the PDC system, the frame adapted to a data-link layer protocol (HDLC) of data processing unit 11 is loaded in the information field of the LAPDM (link access procedure for digital mobile channel) frame at wireless communication unit 12, and then transmitted to the wireless channel. As described above, the protocol to which the data-link layer of data processing terminal 11 is adapted, prescribes that the flag sequences be transferred to wireless communication unit 12 in order to maintain the synchronization of frame operations, even if no essential data to be transferred exists. Therefore, wireless communication unit 12 loads the flag sequences into the information field of the LAPDM frame, and then transmits the frame to the wireless channel. In the receiving device, wireless communication unit 12 receives the LAPDM frame loaded with the flag sequences accordingly.

Unlike devices which are always connected to commercial power supplies and may be applied to LANs (local area networks) and so on, mobile station devices, which are driven by small voltage batteries, have been required to reduce the consumption of electric power. In order to reduce power consumption, with reference to development of protocols and applications, attempts have been made to eliminate the transmission and reception of unnecessary frames in which data is not stored since such unnecessary frames increase the electric power used when transmitting. Furthermore, the limited number of usable frequency bands available has also required that transmission and reception of such unnecessary frames via the wireless channel be eliminated.

If a new protocol and a new application specialized for data communication in mobile communication systems were developed, the above problem would be solved. However, in view of the wide utilization of data communication in mobile. communication systems, it is preferable that the protocols and applications which have been used in LAN and cable network techniques be carried over into the mobile communication technique.

However, as mentioned above, in the existing techniques for LANs and cable networks, the protocol requires that frames without data be transmitted and detected (e.g., HDLC requires flag sequences) so as to synchronize the frame operations and to supervise the maintenance of the wireless link. In addition, it is possible that the application at the uppermost layer of the OSI reference model changes the process due to the link condition. If such an application and protocol are utilized for a mobile communications system, then the transmission and receipt of frames containing no data via the wireless channel is inevitable. In summary, if an application which operates in existing LANs or cable networks is carried over into the conventional mobile communication system (i.e., the application assets are passed on), then power consumption is increased and the use of the wireless channel is not effective.

SUMMARY OF THE INVENTION

Accordingly, it is an object of the present invention to realize effective data communication for a mobile communication system, so as to reduce the power consumption of wireless mobile station devices and the like, and realize effective use in the radio frequency band.

In order to solve the above-described problems, the present invention includes a method for mobile data communication in which a communication protocol is used which prescribes that data prepared by an application be transmitted to a receiving device via a wireless communication channel and that unnecessary data other than the aforementioned data be prepared and transmitted to the wireless channel. The method generally is characterized in deleting the unnecessary data which is prepared according to the communication protocol, so that the unnecessary data is not transmitted to the wireless communication channel. If the mobile data communication device additionally uses another communication protocol prescribing that the unnecessary data prepared by the preceding communication protocol be transformed and that the transformed unnecessary data be transmitted to the wireless communication channel, then the method may comprise the step of deleting the unnecessary data which is transformed according to the communication protocol, so that the unnecessary data is not transmitted to the wireless communication channel.

Accordingly, the unnecessary data or the transformed unnecessary data is deleted, and therefore is not transmitted to the wireless channel. Thus, it is possible to create an environment in which unnecessary data or transformed unnecessary data is not transmitted to the wireless channel. Accordingly, the wireless channel can be utilized effectively, and the consumption of electric power for transmission can be reduced.

In a first aspect of the mobile communication device according to one preferred embodiment of the present invention, the device comprises: a transmitting unit for transmitting input data to a wireless communication channel; a transmission protocol unit operating according to a transmission protocol which prescribes that data prepared by an application be transmitted to the transmitting unit and that unnecessary data other than the aforementioned data be prepared and transmitted to the transmitting unit; and a transmission data processing unit for deleting the unnecessary data supplied from the transmission protocol unit and transferring only the data prepared by the application to the transmitting unit. Accordingly, the unnecessary data is deleted, so that it is not transmitted to the wireless channel. Therefore, it is possible to create an environment in which unnecessary data is not transmitted to the wireless channel. Thus, the wireless channel can be utilized effectively, and the consumption of electric power for transmission by the device itself can be reduced.

In a second aspect of the mobile communication apparatus according to one preferred embodiment of the present invention, the device comprises: a receiving unit for receiving data from a wireless communication channel; a reception protocol unit operating according to a reception protocol which prescribes that the data received by the receiving unit from the wireless communication channel be input into the reception protocol unit and the input data be transferred to the application; and a reception data processing unit for preparing data according to the reception protocol and inputting the prepared data to the reception protocol unit when the receiving unit does not receive data from the wireless communication channel. Accordingly, the data prescribed by the reception protocol can be input into the reception protocol unit, so that the reception protocol unit can recognize the link establishment. Therefore, an application which recognizes the link establishment may be used.

In addition, the first and second aspects may be combined and comprised within one mobile communication device. In this case, the advantages of the aspects may be achieved through one device only.

Furthermore, it is possible to appropriately combine the above-mentioned mobile communication devices to make a system or apparatus. In this case, the unnecessary data deleted by the transmitting device can be supplemented in the receiving device, so that the advantages obtained in the first and second aspects may be accomplished simultaneously.

The program storage medium according to a preferred embodiment of the present invention is characterized in storing a program executing data communication by a mobile communication device which operates according to a communication protocol which prescribes that data prepared by an application be transmitted to a receiving device via a wireless communication channel and that unnecessary data other than the aforementioned data be transmitted to the wireless communication channel, the program executing an operation for deleting the unnecessary data which is prepared according to the communication protocol, so that the unnecessary data is not transmitted to the wireless communication channel. If the mobile data communication device additionally uses another communication protocol prescribing that unnecessary data prepared by the preceding communication protocol be transformed and that the transformed unnecessary data be transmitted to the wireless communication channel, then the program may execute deletion of the unnecessary data which was transformed according to the communication protocol, so that the unnecessary data is not transmitted to the wireless communication channel.

The program stored in the storage medium is executed by a computer system or the like, so that data communication by the above-described method for mobile data communication can be carried out to achieve the aforementioned advantageous effects.

BRIEF DESCRIPTION OF THE DRAWINGS

The advantages and objects of the present invention will become even more clear from a reading of the following description which makes reference to the accompanying drawings, in which:

FIG. 17 shows the layer structure of an OSI reference model.

DETAILED DESCRIPTION OF PREFERRED EMBODIMENTS

Figure 1:
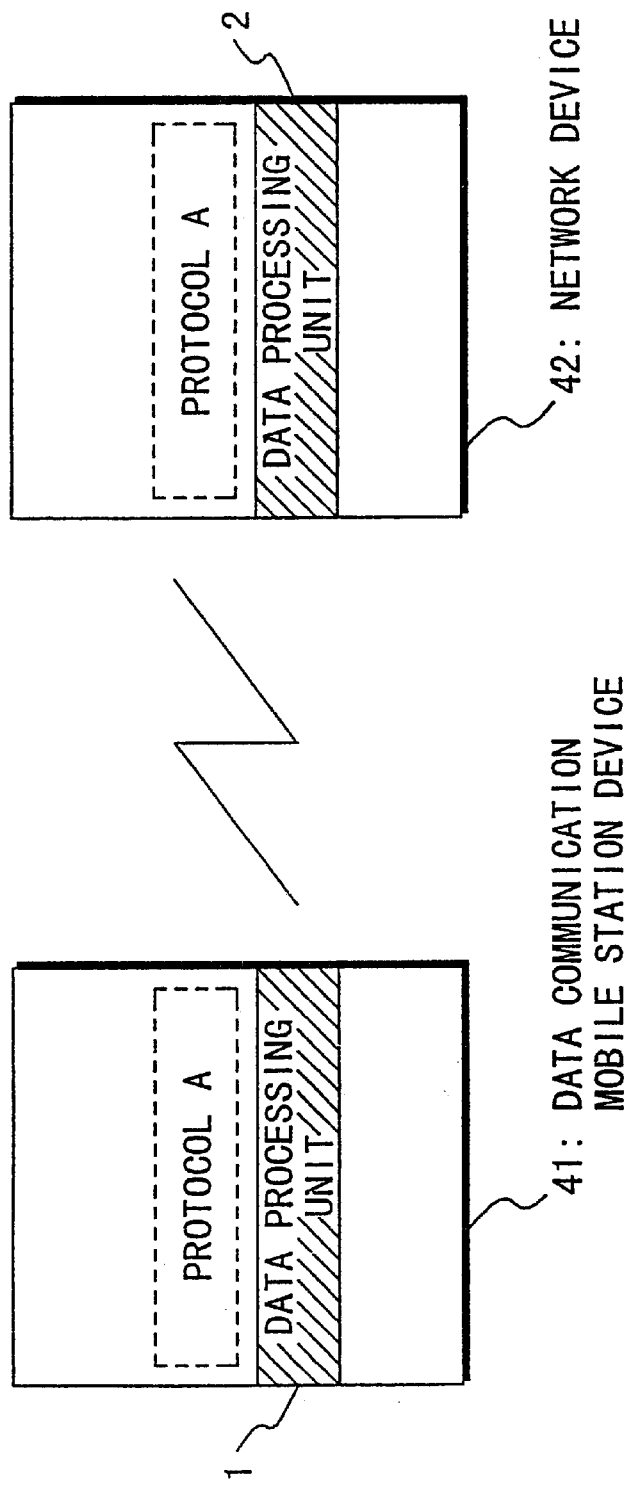
FIG. 1 is a block diagram showing the basic structure of a mobile communication apparatus.

With reference to the accompanying drawings, preferred embodiments of the present invention will now be described. In the drawings, the same reference symbols are attached to elements which are common to FIGS. 15 through 20, and descriptions thereof will be omitted. However, although the same symbols are used in the drawings, some of the elements have different functions, and only such functions will be described.

A: Basic Structure

The basic structure which is the basis or premise of the embodiments will be described first.

A-1: Mobile Communication Apparatus

FIG. 1 is a block diagram showing the basic structure of a mobile communication apparatus according to the present invention. As shown in FIG. 1, the mobile communication apparatus comprises data-communication mobile station device 41 and network device 42 connected to data-communication mobile station device 41 via a wireless communication channel.

Figure 2:
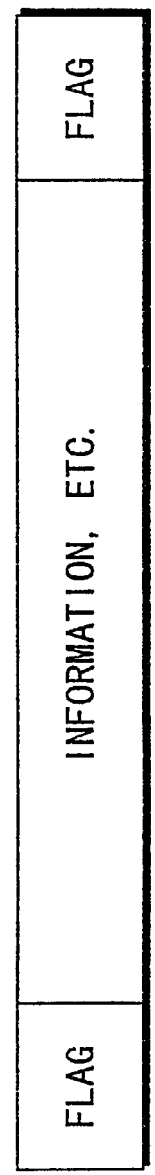
FIG. 2 shows the format of a frame in accordance with protocol A to which the apparatus is adapted.

Data-communication mobile station device 41 comprises a data processing terminal, wireless mobile station device and the like. Data-communication mobile station device 41 operates in accordance with a protocol (communication protocol) A (e.g., the aforementioned HDLC) for transmitting a frame, the format of which is shown in FIG. 2, to the wireless communication channel, and receiving the same formatted frame. In FIG. 2, the flag denotes the beginning and end of the frame, and information denotes data which will be transmitted. Under Protocol A prescribed data will be compulsorily transmitted to the wireless channel at certain time intervals, when data requiring transmission does not exist. In addition, protocol A supervises the conditions for establishing the wireless link between data-communication mobile station device 41 and network device 42 by detecting the prescribed data. On the other hand, network device 42 comprises a base station and the like, and is also adapted to protocol A.

While data-communication mobile station device 41 includes a data processing unit 1, network device 42 includes a data processing unit 2. Data processing units 1 and 2 of data-communication mobile station device 41 and network device 42 delete the prescribed data which should be transmitted therefrom according to protocol A. Data processing units 1 and 2 of data-communication mobile station device 41 and network device 42 prepare the prescribed data and transfer it to the application side in its own device according to protocol A. Consequently, although the prescribed data is not transmitted via the wireless channel, an application installed in devices 41 and 42 can detect the prescribed data in order to maintain the link between devices 41 and 42.

Various examples of data processing units in the data-communication mobile station device and the network device will be explained next. However, since examples of the data-communication mobile station device are similar to those of the network device, only those of the data-communication mobile station device will be explained, so that the description may be simplified.

A-2: Data-Communication Mobile Station Device without Hookup Unit

Figure 3:
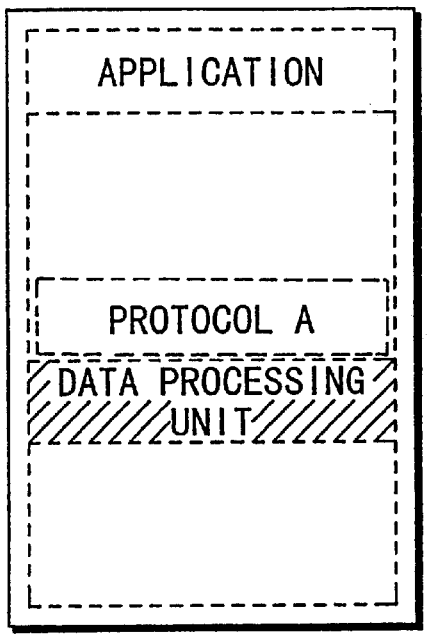
FIG. 3 is a block diagram showing the structure of a data-communication mobile station device, which may be used in the apparatus, without a hookup unit.

FIG. 3 shows the structure of a data-communication mobile station device which does not include an internal hookup unit. The design resembles that of the device shown in FIG. 1. Although the data processing unit is situated below protocol A in the structure shown in FIG. 3, it is possible to prepare protocol A to have the functions of a data processing unit.

A-3: Data-Communication Mobile Station Device with One Hookup Unit

Figure 4:
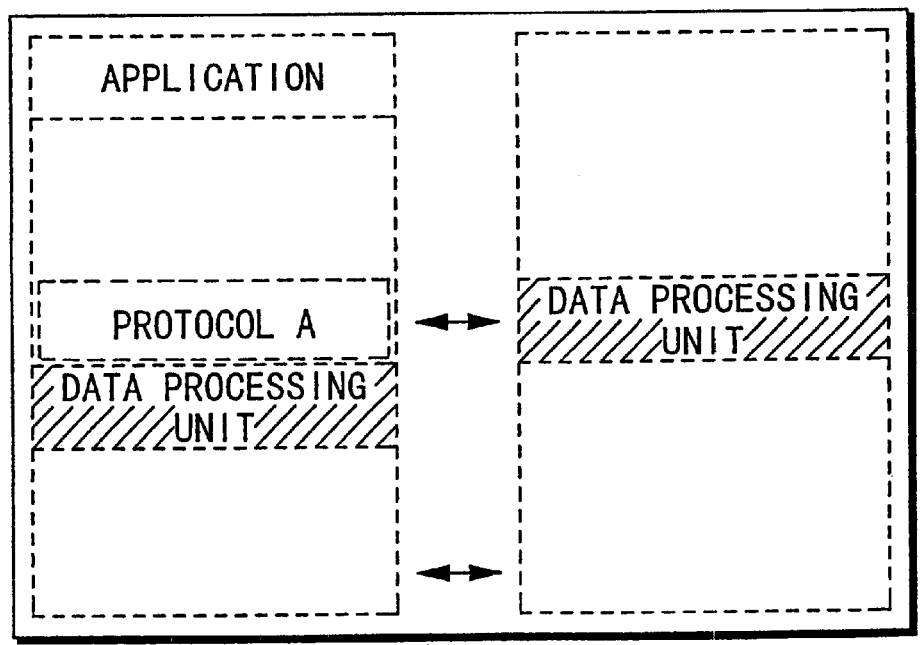
FIG. 4 is a block diagram showing the structure of another data-communication mobile station device, which may be used in the apparatus, with a hookup unit.

FIG. 4 shows the structure of a data-communication mobile station device which includes an internal hookup unit. The data-communication mobile station device in FIG. 4 comprises two parts: a data processing terminal and a hookup unit, the data processing unit being linked with the wireless channel via the hookup unit. In the structure shown in FIG. 4, the data processing unit may be situated below protocol A. Instead, it is possible to prepare protocol A to have the function of a data processing unit or to provide the data processing unit to a layer of the hookup unit, the layer being on the same level as protocol A.

A-4: Data-Communication Mobile Station Device with a Plurality of Hookup Units

Figure 5:
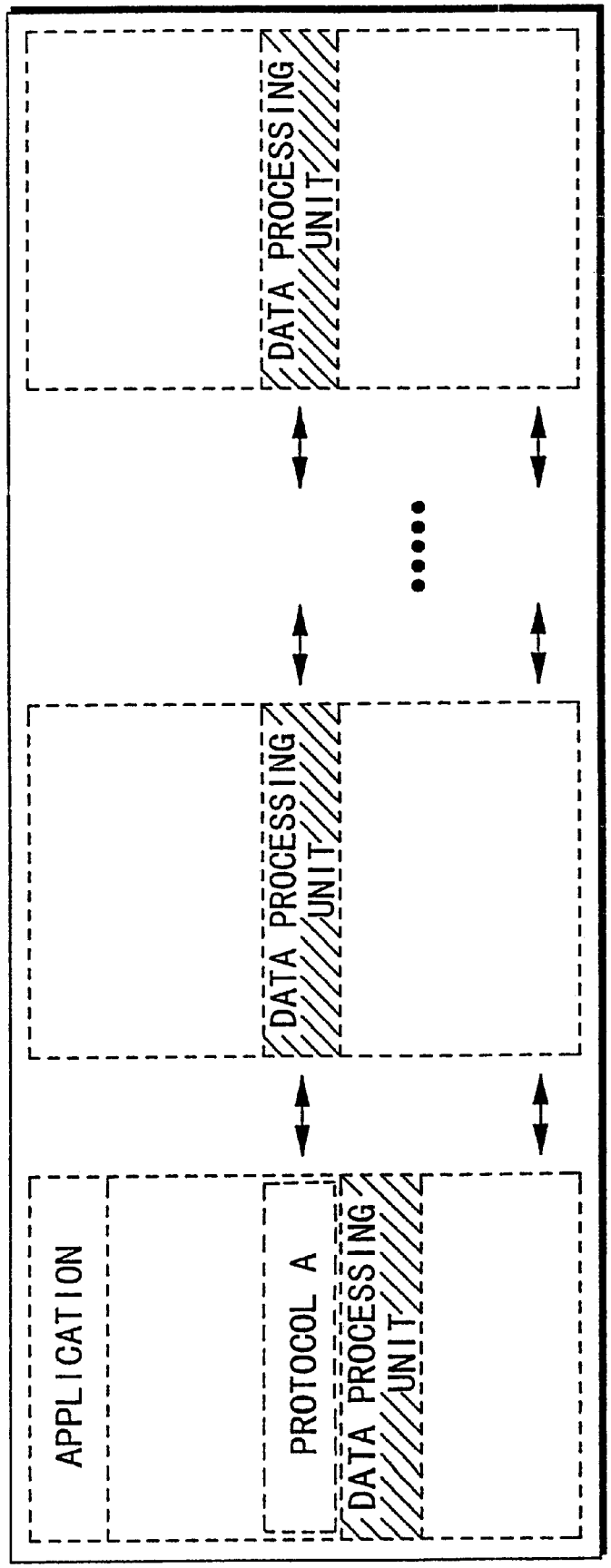
FIG. 5 is a block diagram showing the structure of another data-communication mobile station device, which may be used in the apparatus, with a plurality of hookup units.

FIG. 5 shows the structure of a data-communication mobile station device which includes a plurality of internal hookup units. The data-communication mobile station device in FIG. 5 may be divided into a data processing terminal and a plurality of hookup units, the data processing unit being linked with the wireless channel via the hookup units. In the structure shown in FIG. 5, the data processing unit may be situated below protocol A. Instead, it is possible to prepare protocol A to have the function of the data processing unit or to provide the data processing unit to a layer of any of the hookup units, the layer being the same level as protocol A.

Next, various embodiments based on the basic structure will be described. In the embodiments, the operations are governed by different protocols: the most distant units from the wireless channel are adapted to protocol A, the second-most distant units are adapted to protocol B, and the third-most distant unit are adapted to protocol C. In relation to the units to which protocols A, B and C are adapted, data link layers will be called data link layers A, B and C, respectively, and physical layers will be called physical layers A, B and C, respectively. In the embodiments, protocol A is the above-mentioned HDLC.

B: First Embodiment

Figure 6:
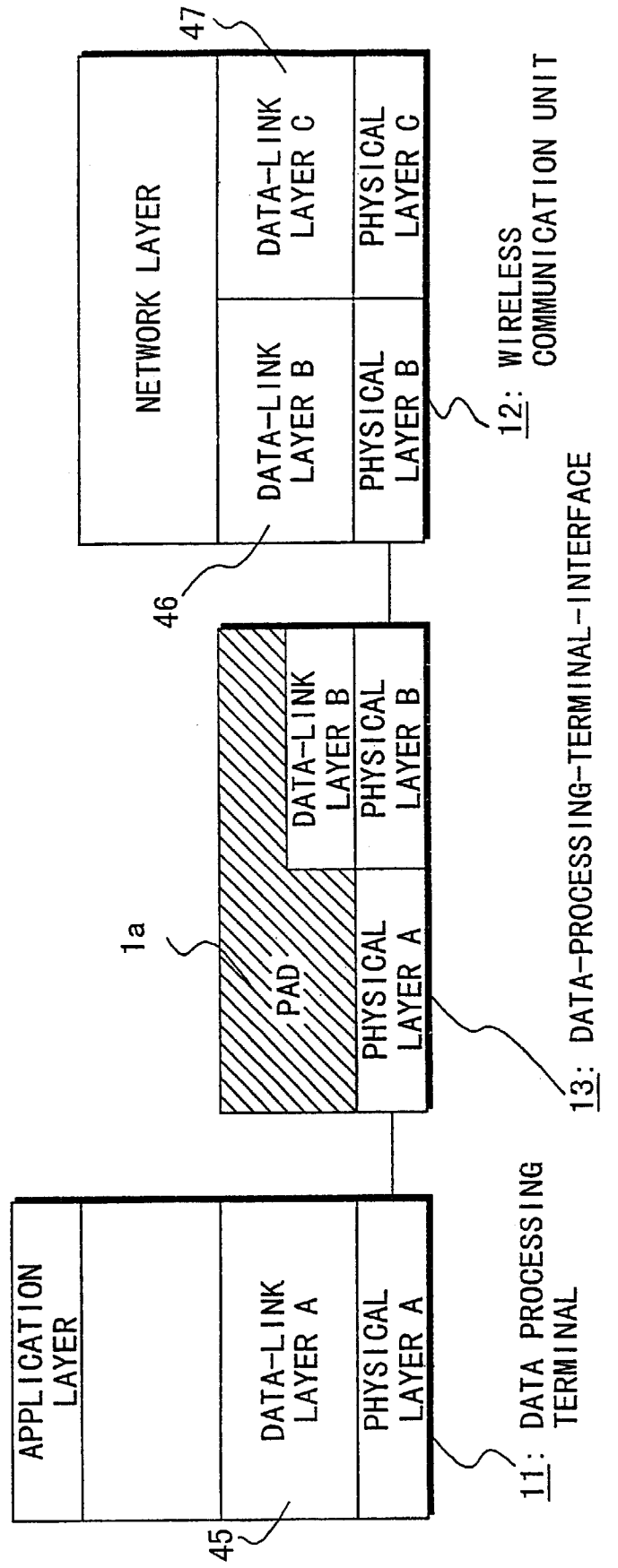
FIG. 6 is a block diagram showing the structure of a data-communication mobile station device according to a first embodiment of the present invention.

FIG. 6 is a block diagram showing the structure of a data-communication mobile station device according to a first embodiment of the present invention. PAD (Packet Assembler/Disassembler) 1a in the data-processing-terminal-interface 13 has a packet assembling/disassembling function for the protocol for data-link layer A and the protocol for data-link layer B. The packet assembling/disassembling function for the protocols serves to assemble and disassemble a packet. In PAD 1a in FIG. 6, the packet assembling/disassembling function includes a function to disassemble a packet from data-link layer B for extracting the frame for the protocol for data-link layer A and to transfer the frame to physical layer A, and a function to assemble a packet including the frame for the protocol for data-link layer A and to transfer the packet to data-link layer B. The term., "frame for the protocol for data-link layer A" means a frame which may be transferred between the data-link layer and the physical layer which operates in accordance with protocol A.

In addition, the PAD (transmission data processing unit and reception data processing unit) has an operational function to delete the flag sequences as will be described hereinafter.

Figure 18:
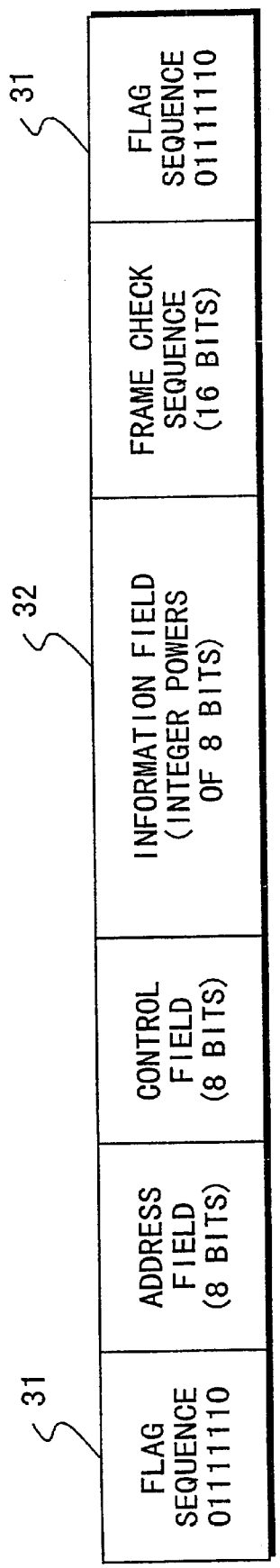
FIG. 18 shows the frame format for a protocol according to the HDLC.
Figure 19:
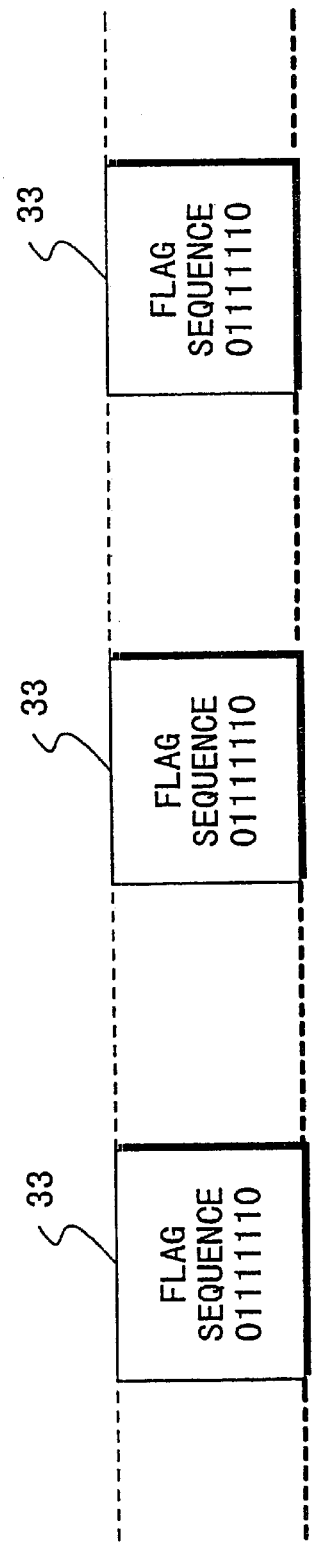
FIG. 19 shows an example of transmission of flag sequences as inter-frame-time fills.

The frame for the protocol for data-link layer A 45 of the data processing unit (transmission protocol unit and reception protocol unit) 11 has a format in which data for transmission is inserted between flag sequences 31 with a prescribed bit pattern as shown in FIG. 18. In addition, the protocol for data-link layer A prescribes flag sequences 33 to be transferred to the lower layers although no data requiring transmission exists during communication as shown in FIG. 19. However, according to the flowchart shown in FIG. 7, PAD 1a deletes flag sequences, so as not to transfer them to the wireless communication unit (transmitting unit and receiving unit) 12 if the flag sequences are transferred n times without data for transmission from data processing terminal 11.

Otherwise, the frames for the protocol for data-link layer A 45 are transferred via the data-processing-terminal-interface 13 to wireless communication unit 12, and then loaded in the information fields of the frames for the protocol for data-link layer C47, so as to be transmitted to the wireless channel. In this case, each of the frames for the protocol for data-link layer A 45 may be loaded in each of the frames for the protocol in data-link layer C47. However, units which do not recognize frames are also acceptable.

Next, with reference to the flowchart shown in FIG. 7, the operation for deleting the flag sequences in data-processing-terminal-interface 13 will be explained.

First, PAD 1a detects the flag sequence in step S21 during communication. Then, in step S22, PAD 1a determines whether the newly detected flag sequence accompanies data transmission or not. Here, if the flag sequence does not accompany data transmission, PAD 1a increases counter number n' by an increment of 1 in step S23. A determination is made that the present flag sequence does not accompany data transmission only when there is no data between the present flag sequence and the preceding flag sequence, and present flag sequence and the proceeding flag sequence. After step S23, in step S24, PAD 1a determines if the counter number n' is equal to or greater than a predetermined number n at step S24. Here, if the counter number n' is equal to or greater than a predetermined number n, PAD 1a deletes the received flag sequence in step S25.

On the other hand, at step S22, if the subject flag sequence accompanies data transmission, then in step S26, PAD 1a transfers the data with the flag sequence, as in the initial format, to wireless communication unit 12, and resets the counter number n' to 1. The routine then returns to step S21. Additionally, at step S24, if the counter number n' is less than the predetermined number n, then, in step S27, PAD 1a transfers the data with the flag sequence, as in the initial format, to wireless communication unit 12. The routine then returns to step S21.

In summary, after the flag sequences are transferred n times without data transmission from data processing terminal 11, PAD 1a operates to delete the received flag sequences before receiving subsequent data. In a preferred embodiment, in order to minimize total transmission of unnecessary flag sequences, the number n is set in advance to be 2.

By virtue of the above-described operational function of PAD 1a in accordance with the present embodiment, if there is no data to be transmitted, the flag sequences prepared in data processing terminal 11 can be deleted in data-processing-terminal-interface 13, so that they are not supplied to wireless communication unit 12. Accordingly, it is possible to create an environment in which frames with unnecessary flag sequences are not transmitted to the wireless channel. In other words, the wireless channel is not used for transmission of unnecessary frames which do not contain data requiring transmission. Therefore, the wireless channel can be utilized effectively, and the consumption of electric power by wireless communication unit 12 (for example, a wireless mobile station device) can be reduced.

Furthermore, PAD 1a has another operational function to prepare flag sequences which will be described next.

As discussed above, PAD 1a extracts the frame for the protocol for data-link layer A from the information field of the packet which is being transferred from data-link layer B to the upper layer, and transfers the frame to data processing terminal 11 via physical layer A. However, when m seconds have passed after transferring the frame for the protocol for data-link layer A to data processing terminal 11, PAD 1a prepares the flag sequence and transfers it to data processing terminal 11. This operational flow is shown in the flowchart in FIG. 8. As may be understood from FIG. 8, PAD 1a comprises a timer. During the interval when the timer count is determined to be less than m seconds at step S32, PAD 1a repeats the processes of steps S32 and S33. Namely, PAD 1a receives the packet loaded with data from wireless communication unit 12 and transfers the frame loaded with the subject data for the protocol for data-link layer A to physical layer A of data processing terminal 11 (step S32), and resets the timer for commencing count up again (step S33). When the timer count is determined to be equal to or greater than m seconds (the time limit), PAD 1a prepares the flag sequence and transfers it to physical layer A in step S34, and resets the timer for commencing count up again in step S33. Accordingly, during the interval when wireless communication unit 12 receives no data from the wireless channel, the flag sequences are transferred from PAD 1a to data processing terminal 11 at an interval of m seconds. The above-mentioned "m seconds" is the time interval in which the protocol for data-link layer A can maintain the link establishment, and may be specifically decided according to the protocol for data-link layer A.

Figure 7:
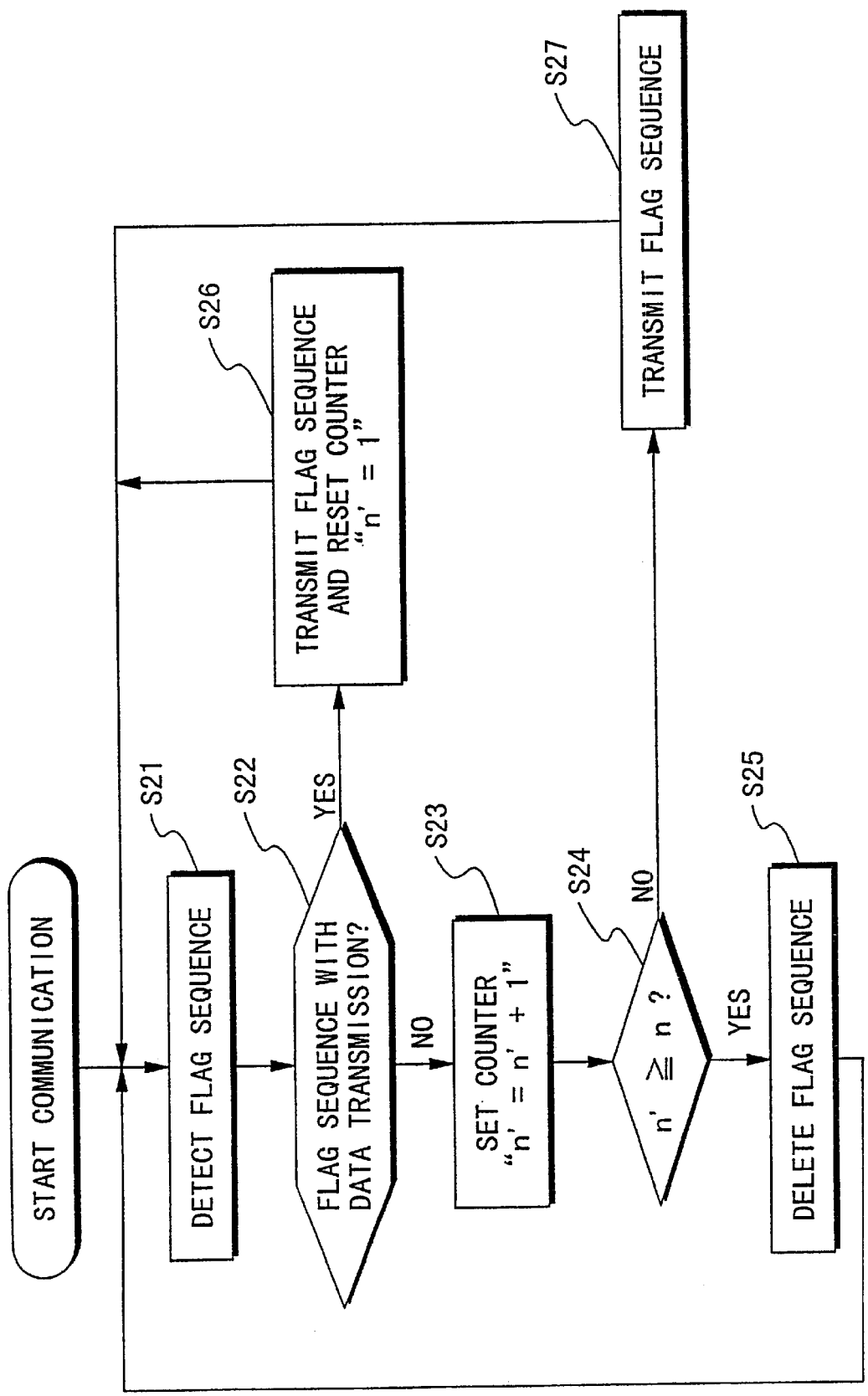
FIG. 7 is a flowchart showing the operation for deleting flag sequences in the data-communication mobile station device.

In summary, when PAD 1a does not receive data from does not receive data from wireless channel 12 for m seconds or more, since the flag sequences have been deleted by virtue of the operation represented in FIG. 7 then PAD 1a prepares flag sequences and transfers them to data-link layer A 45 of data processing terminal 11. Therefore, the application installed in data processing terminal 11 can receive the flag sequences as the inter-frame-time fills, so that data-link layer A of data processing terminal 11 can maintain the link establishment. Accordingly, it is possible to certainly maintain with surety the link between the data-communication mobile station device and the network device, so that the upper-level application is not affected by the fact that the flag sequences are not sent through the wireless channel.

B-1: First Variation

Figure 9:
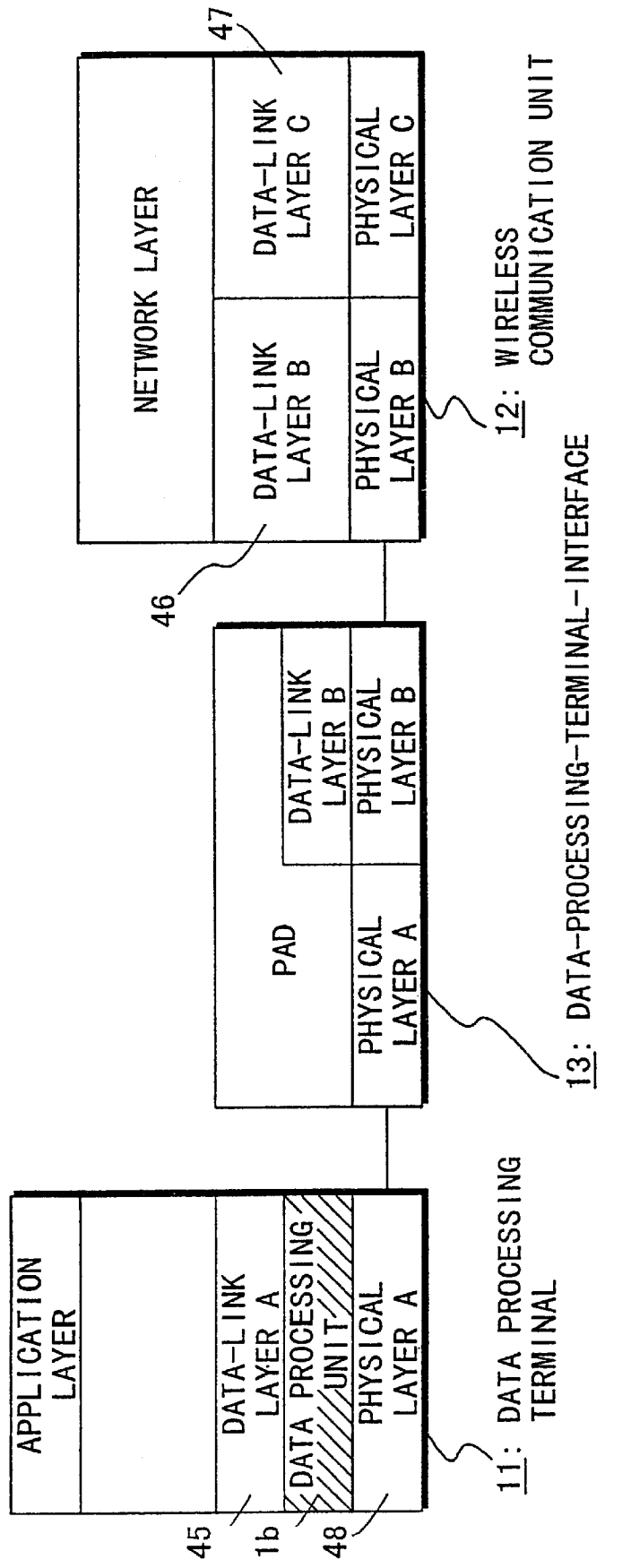
FIG. 9 is a block diagram showing the structure of a first variation of the data-communication mobile station device.

FIG. 9 is a block diagram showing the structure of a first variation of the datacommunication mobile station device according to the first embodiment. As depicted in FIG. 9, a data processing unit 1b, the operational function of which will be described, is inserted between data-link layer A 45 and physical layer A 48 in data processing terminal 11 in accordance with the first variation, and the operational function carried out by data processing unit 1b is deleted from the PAD of dataprocessing-terminal-interface 13.

Data processing unit 1b deletes a flag sequence and does not transfer it to physical layer A 48 of data processing terminal 11 if a flag sequence without data transmission is transferred from data-link layer A 45 to the lower layer. Accordingly, this kind of flag sequence from data-link layer A 45 is not transferred to the wireless channel. In addition, data processing unit 1b prepares a flag sequence and transfers it to data-link layer A 45 when a time period (e.g., m seconds) has passed after transferring the preceding frame for the protocol for data-link layer A or the preceding flag sequence to data-link layer A 45.

As may be clearly understood by the above description, since unnecessary frames without data are not transmitted to the wireless channel in the present variation, similar to the data-communication mobile station device in FIG. 6, the wireless channel can be used effectively and the consumption of electric power by wireless communication unit 12 can be reduced. In addition, since the application in data processing terminal 11 can receive the flag sequences as inter-frame-time fills, the application in data processing terminal 11 can recognize the link establishment of data-link layer A, so as to maintain the link between the data-communication mobile station device and the network device. The above-described advantages are common to the second through fifth variations which will be explained hereinafter.

B-2: Second Variation

Figure 10:
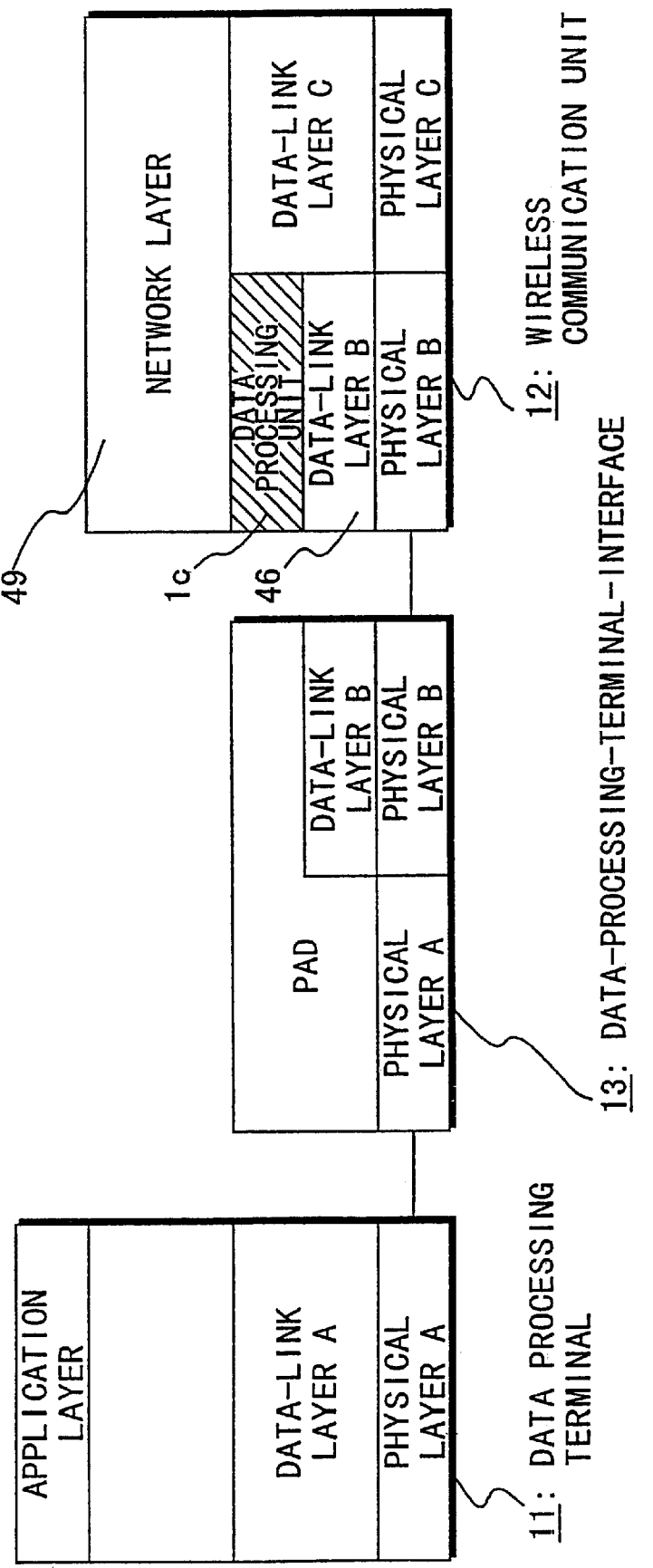
FIG. 10 is a block diagram showing the structure of a second variation of the data-communication mobile station device.

FIG. 10 is a block diagram showing the structure of a second variation of the data-communication mobile station device according to the first embodiment. As depicted in FIG. 10, a data processing unit 1c, the operational function of which will be described, is inserted between data-link layer B 46 and network layer 49 in wireless communication unit 12 in accordance with the second variation, and the operational function carried out by data processing unit 1c is deleted from the PAD of data-processing-terminal-interface 13.

Data processing unit 1c of wireless communication unit 12 deletes a flag sequence and does not transfer it to network layer 49 if data processing unit 1c receives the flag sequence without the data transmission from data processing terminal 11. In addition, data processing unit 1c prepares a flag sequence and transfers it to data-link layer B 46 when a time period (e.g., m seconds) has passed after transferring the frame for the protocol for data-link layer A or the preceding flag sequence to data-link layer B 46.

B-3: Third Variation

Figure 11:
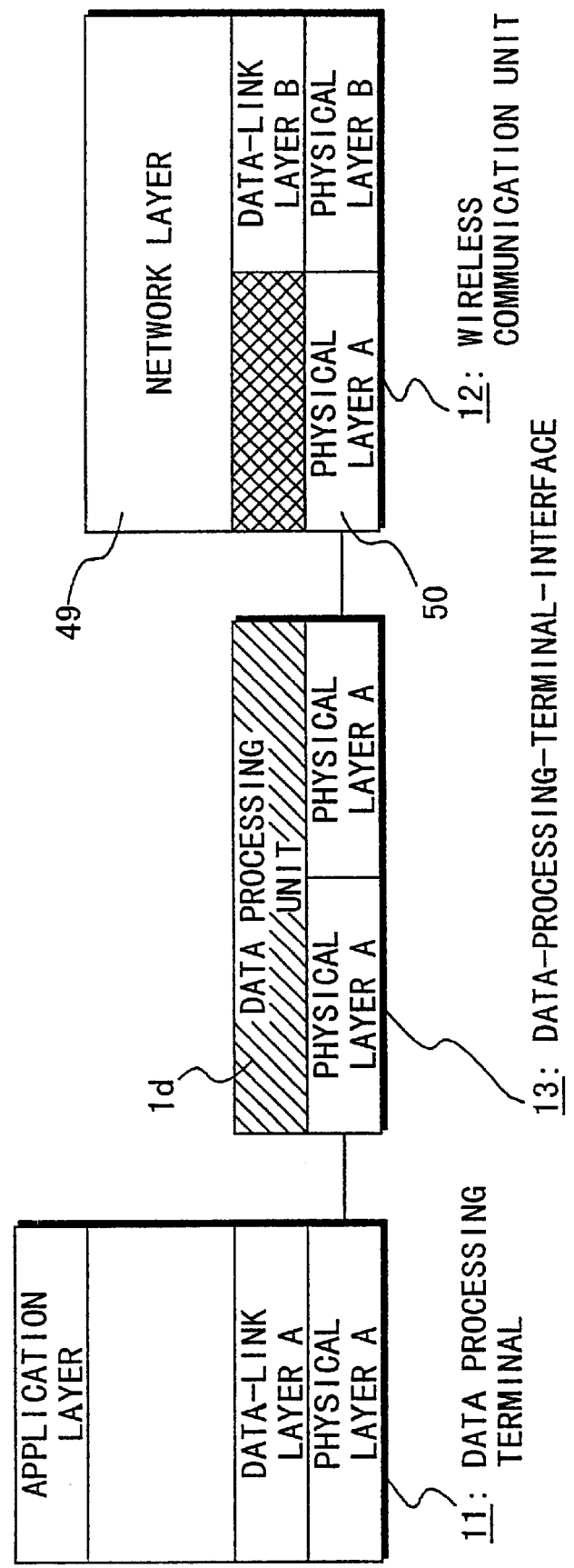
FIG. 11 is a block diagram showing the structure of a third variation of the datacommunication mobile station device.

FIG. 11 is a block diagram showing the structure of a third variation of the data-communication mobile station device according to the first embodiment. As may be clearly understood by FIG. 11, the transferring of the protocol is not carried out in dataprocessing-terminal-interface 13 in accordance with the third variation. Instead of the PAD, data-processing-terminal-interface 13 is provided with a data processing unit 1d, the operational function of which will be described.

Data processing unit 1d deletes a flag sequence and does not transmit it to the wireless channel if flag sequences without data transmission are transferred from data processing terminal 11 n times or more in series. In addition, when m seconds have passed after transferring the preceding frame for the protocol for data-link layer A, data processing unit 1d prepares flag sequences and transfers them until a frame loaded with data is transmitted from wireless communication unit 12.

B-4: Fourth Variation

Figure 12:
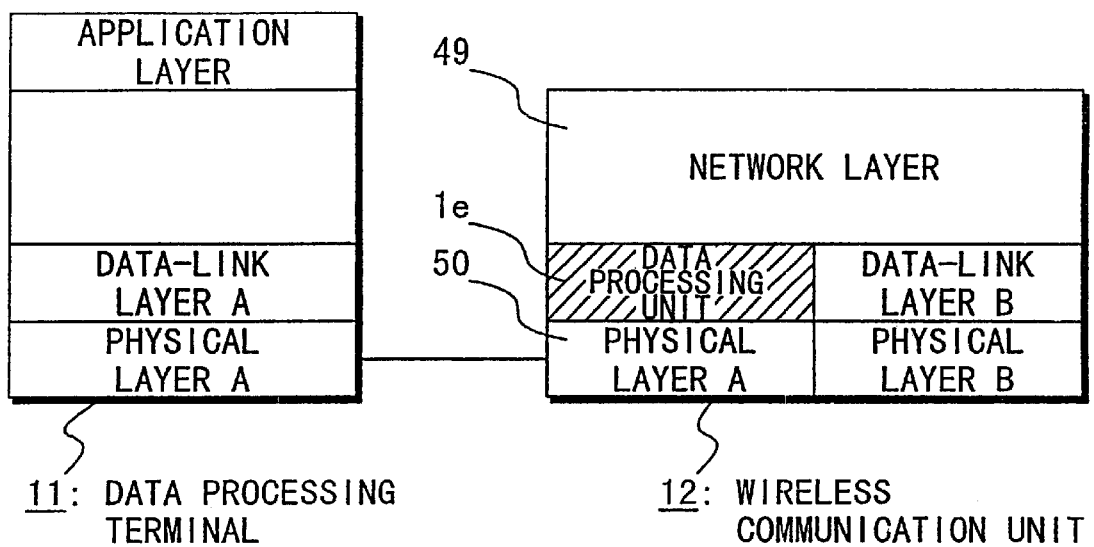
FIG. 12 is a block diagram showing the structure of a fourth variation of the data-communication mobile station device.

FIG. 12 is a block diagram showing the structure of a fourth variation of the data-communication mobile station device according to the first embodiment. As depicted in FIG. 12, data processing terminal 11 and wireless communication unit 12 are directly connected to each other, or functionally connected on the same hardware. A data processing unit 1e is inserted between a physical layer A 50 and a network layer 49 in the wireless communication unit. With the exception of the protocol for the lower layer, the operational function of data processing unit 1e is the same as that of data processing unit 1c in FIG. 10, so that the description will be omitted.

B-5: Fifth Variation

Figure 13:
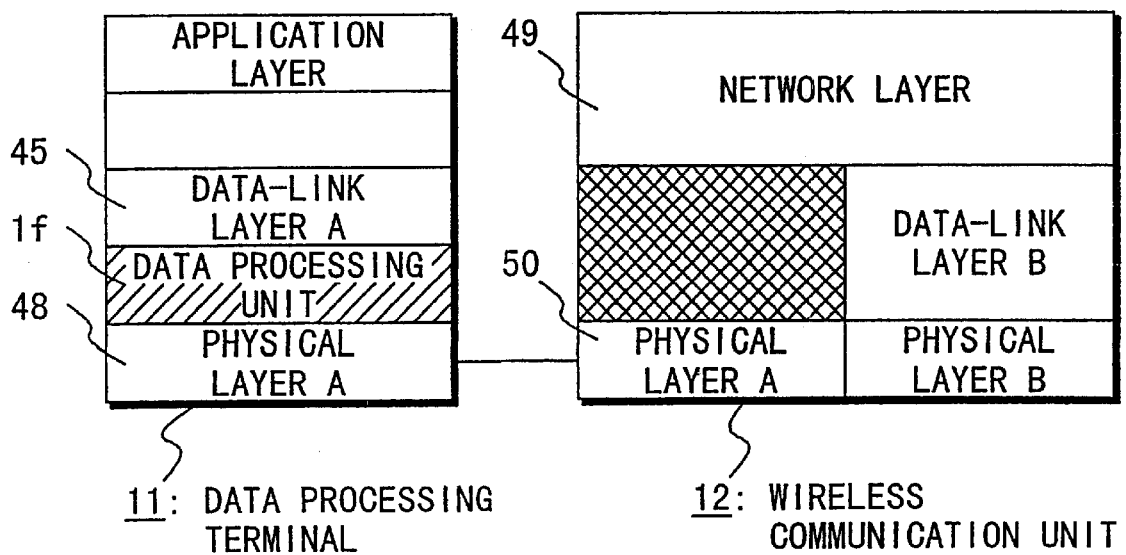
FIG. 13 is a block diagram showing the structure of a fifth variation of the data-communication mobile station device.
Figure 15:
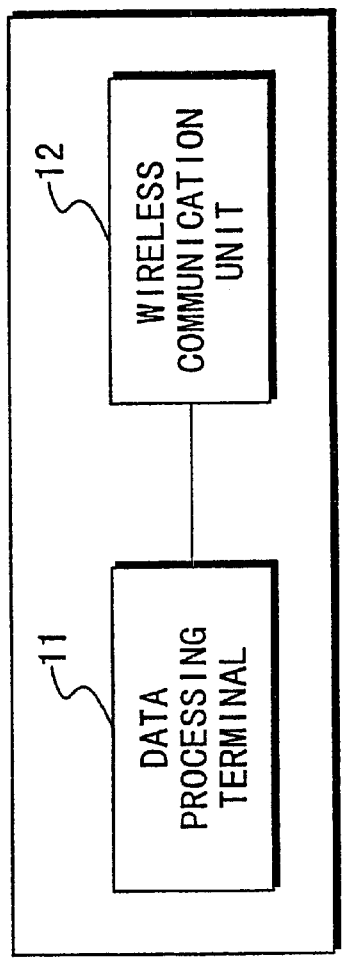
FIG. 15 is a block diagram showing the structure of a conventional data-communication mobile station device.
Figure 16:
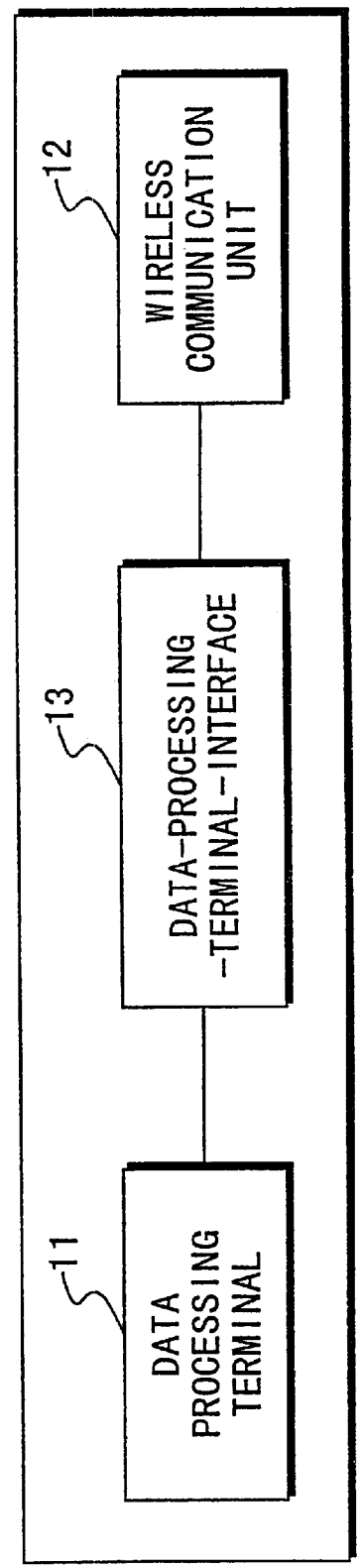
FIG. 16 is a block diagram showing the structure of another conventional data-communication mobile station device.

FIG. 13 is a block diagram showing the structure of a fifth variation of the data-communication mobile station device according to the first embodiment. As shown in FIG. 15, in accordance with the fifth variation, a data processing unit 1f is inserted between a physical layer A 48 and data-link layer A 45 in data processing terminal 11. The operational function of data processing unit 1f is the same as that of the data processing unit 1b in FIG. 9 and the structure of wireless communication unit 12 is the same as shown in FIG. 11, so that descriptions thereof will be omitted.

As shown in FIGS. 6 through 13, the physical layers A among different units are connected with one another in an appropriate manner, using, for example, a cable connection through which voltage or current passes as signals, a wireless communication means, an optical communication means using with infrared waves or laser beams, or a sound wave communication means.

C: Second Embodiment

Figure 14:
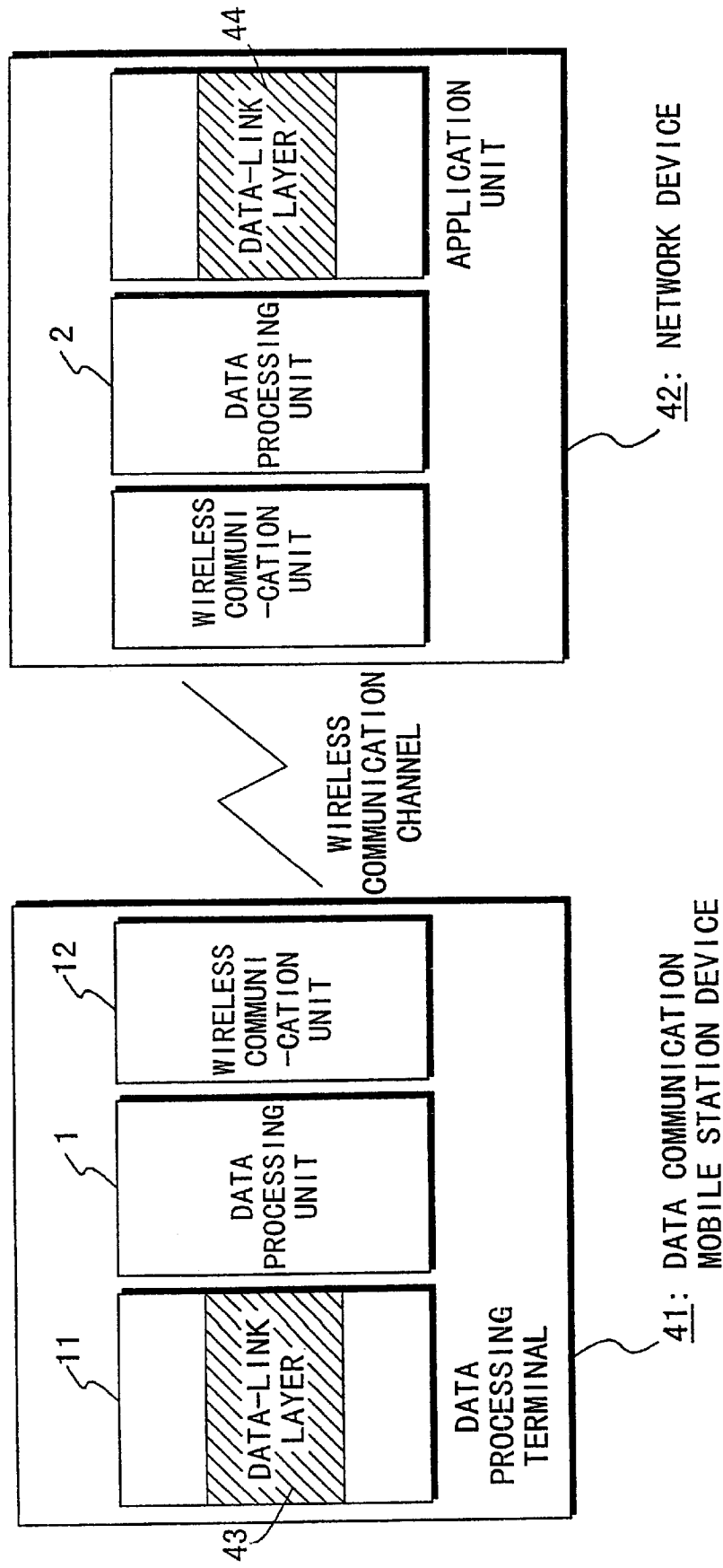
FIG. 14 is a block diagram showing a data-communication mobile station device according to a second embodiment of the present invention.

FIG. 14 is a block diagram showing a data-communication mobile station device according to a second embodiment of the present invention. As shown in FIG. 14, the mobile communication apparatus comprises a data-communication mobile station device 41 and a network device 42. These may be connected with each other via a wireless channel, so that a data-link layer of network device 42 may be linked with a data-link layer 43 of data processing terminal 11.

The structure of data-communication mobile station device 41 is the same as in the preceding first embodiment and the variations thereof, but is simplified in FIG. 14. That is, data processing unit 1 for deleting and preparing the flag sequences is situated between data-link layer 43 and the wireless channel. Similarly, in network device 42, data processing unit 2 resembling data processing unit 1 is situated between data-link layer 44 and the wireless channel.

As may be understood by the above description of the first embodiment, when data processing unit 1 of data-communication mobile station device 41 receives a flag sequence from data link layer 43 of data-communications mobile station device 41 which does not accompany data transmission, then, in accordance with, for example, the operational flow shown in FIG. 7, data processing unit 1 deletes the flag sequence so that it is not transmitted to the wireless channel. Similarly, data processing unit 2 of data-communication mobile station device 42 deletes the flag sequence which does not accompany data transmission in accordance with, for example, the operational flow represented in FIG. 7, so that it is not transmitted to the wireless channel when data processing unit 2 receives such a flag sequence from data-link layer 44 of network device 42.

In summary, the flag sequences without data transmission are deleted in data-communication mobile station device 41 and network device 42, so that they are not transmitted to the wireless channel. Accordingly, it is possible to create an environment in which the frames with the unnecessary flag sequences are not transmitted to the wireless channel. In other words, the wireless channel is not used for transmission of unnecessary frames without data which should be transmitted. Therefore, the wireless channel can be utilized effectively, and the consumption of electric power by wireless communication unit 12 can be reduced. In particular, since wireless communication unit 12 of data-communication mobile station device 41 is a wireless mobile station device or the like, users can benefit tremendously from the reduction in power consumption.

Figure 8:
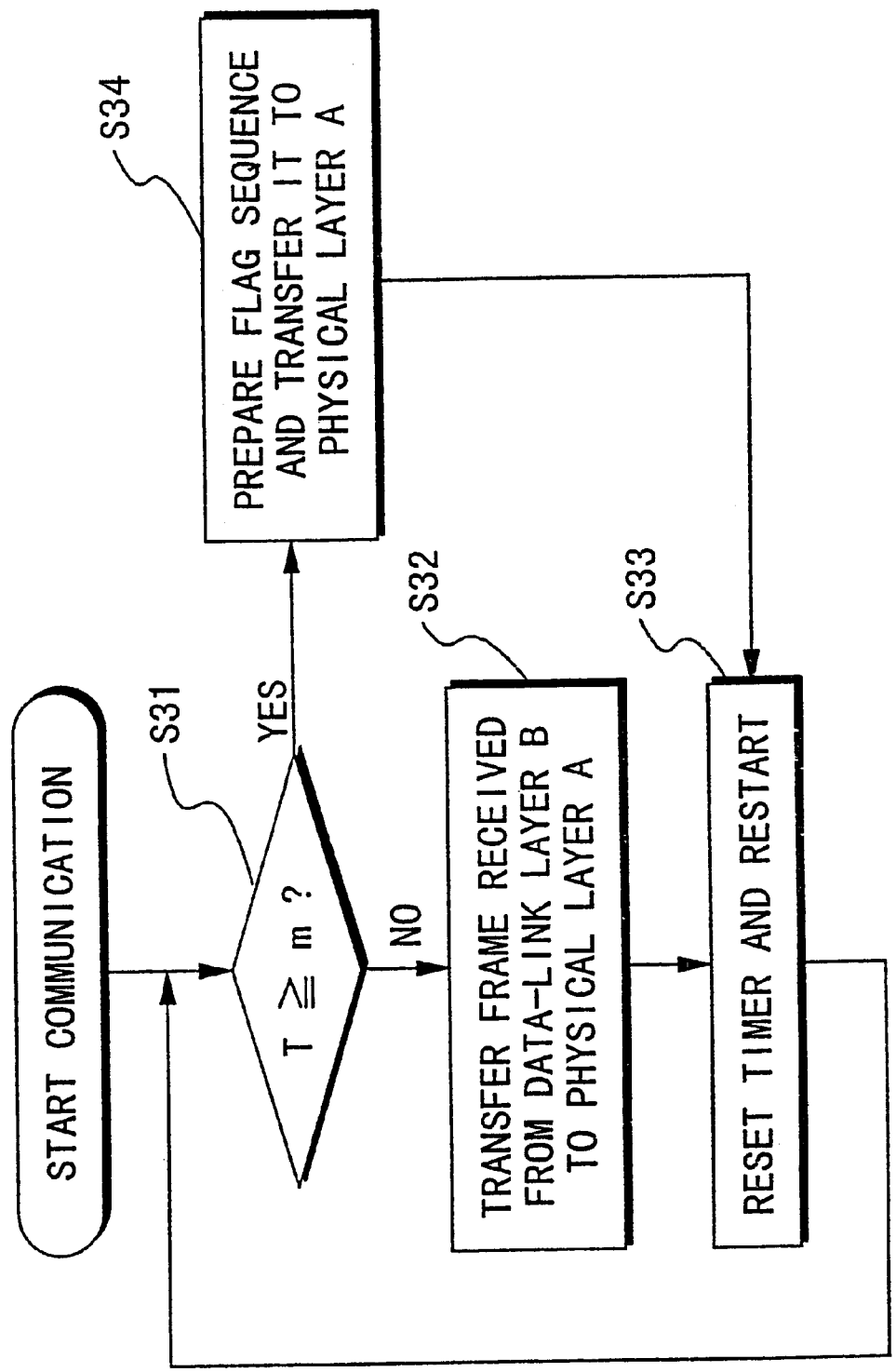
FIG. 8 is a flowchart showing the operation for preparing the flag sequences by PAD 1a in the data-communication mobile station device.

Furthermore, as may be understood by the description of the first embodiment, after reception of data from the wireless channel since the flag sequences without data transmission are deleted which flag sequences are deleted since they do not accompany data transmission from the wireless channel, data processing unit 1 in data-communication mobile station device 41 prepares the flag sequences and transfers them to data-link layer 43 of data processing terminal 11 as depicted in FIG. 8. Similarly, after no reception of the data from the wireless channel since the flag sequences without data transmission are deleted, data processing unit 2 in the data-communication mobile station device 42 prepares the flag sequences and transfers them to data-link layer 44 of the application unit.

Accordingly, the applications in data-communication mobile station device 41 and network device 42 can recognize the link establishment of the data-link layers thereof, respectively, and can maintain the link establishment with surety.

D: Supplemental Description

Although the embodiments described above are adapted to HDLC, the present invention is not intended to be limited thereto, but is to be accorded to any protocols which prescribe that data (which should not be limited to the flag sequence) unnecessary to essential data transmission should be transmitted.

In addition, although flag sequences without data transmission are deleted so as not to be transmitted to the wireless channel in the above-described embodiments, the present invention is not limited thereto. For example, if the flag sequences are loaded in frames for another protocol for another data-link layer (i.e., if the flag sequences are transformed by another protocol for another data-link layer), then the frames as a whole may be deleted so that they are not transmitted to the wireless channel.

In addition, a computer program which executes the operational functions carried by the above-described embodiments may be stored in a storage medium, and the operational functions may be executed by reading the computer program from the program storage medium using a computer system. The program storage medium may be located in the computer system executing the operational functions or in an optional position on a computer network.

By reducing the power consumption of the wireless mobile station device or the like, the lifetime of the battery can be enhanced.

We claim:

1. A method for mobile data communication between a sender side and a receiver side, the method comprising:
   generating a series of transmissions on the sender side, wherein there is at least one flag between at least two adjacent series of transmissions, wherein the at least one flag notifies the receiver side of a beginning or end of a transmission and of a continuous establishment of a communication link;
   determining on the sender side an elapsed time during which at least one transmission is transmitted without data after a last transmission with data is transmitted; and
   eliminating on the sender side transmissions that are transmitted without data after the elapsed time until a transmission with data is transmitted.

2. The method of claim 1 wherein the elapsed time is measured by a number of transmissions that are transmitted without data.

3. The method of claim 2 wherein the number of transmissions that is used to measure the elapsed time is two.

4. The method of claim 1 wherein for a certain period of time after receiving the last transmission from the sender side, the receiver side generates at intervals a transmission without data that is accompanied by the flag.

5. A system for mobile data communication between a sender side and a receiver side, the sender side comprising:
   a transmitter configured to generate a series of transmissions, wherein there is at least one flag between at least two adjacent series of transmissions, wherein the at least one flag notifies the receiver side of a beginning or end of a transmission and of a continuous establishment of a communication link; and
   a data processing unit configured to determine an elapsed time during which at least one transmission is transmitted without data after a last transmission with data is transmitted and eliminate transmissions that are transmitted without data after the elapsed time until a first transmission with data is transmitted.

6. The system of claim 5, wherein for a certain period of time after receiving the last transmission from the sender side, the receiver side is configured to generate at intervals a transmission without data that is accompanied by the flag.

7. The system of claim 5, wherein the sender side further comprises a data processing terminal and the data processing unit is located in the data processing terminal.

8. The system of claim 7 wherein the data processing terminal further comprises communication protocol layers and the data communication unit is located between a data-link layer and a physical layer.

9. The system of claim 5 wherein the sender side further comprises a data processing terminal interface and the data processing unit is located in the interface.

10. The system of claim 9 wherein the data processing terminal interface further comprises communication protocol layers and the data processing unit is located between a physical layer and a data-link layer.

11. The system of claim 10 wherein the data processing terminal interface further comprises a packet assembler/disassembler and the data processing unit is located in the packet assembler/disassembler.

12. The system of claim 7 wherein the data processing terminal interfaces further comprises communication protocol layers and the data processing unit is located above a physical layer.

13. The system of claim 5 wherein the sender side further comprises a wireless communication unit and the data processing unit is located in the wireless communication unit.

14. The system of claim 13 wherein the wireless communication unit further comprises communication protocol layers and the data processing unit is located in between a network layer and data-link layers.

15. The system of claim 13 wherein the sender side further comprises a data processing terminal in communication with the wireless communication unit.

16. The system of claim 15 wherein the data processing terminal further comprises communication protocol layers from the group comprising an application layer, a data-link layer and a physical layer.

17. The system of claim 7 wherein the sender side further comprises a wireless communication unit in communication with the data processing terminal.

18. The system of claim 17 wherein the data processing terminal further comprises communication protocol layers and the data processing unit is located in between a data-link layer and a physical layer.

19. A system for mobile data communication, the system comprising:

a data processing terminal;

said data processing terminal operatively connected to a data processing terminal interface;

the data processing terminal interface operatively connected to a wireless communication unit;

wherein at least one of the data processing terminal, the data processing terminal interface and the wireless communication unit is configured to generate a series of transmissions, wherein there is at least one flag between at least two adjacent series of transmissions, wherein the at least one flag notifies the receiver side of a beginning or end of a transmission and of a continuous establishment of a communication link;

wherein at least one of the data processing terminal, the data processing terminal interface and the wireless communication unit is configured to determine an elapsed time during which at least one transmission is transmitted without data after a last transmission with data is transmitted; and wherein at least one of the data processing terminal, the data processing terminal interface and the wireless communication unit is configured to eliminate transmissions that are transmitted without data after the elapsed time until a first transmission with data is transmitted.

20. A mobile communication device, the device comprising:

a transmitter configured to generate a series of transmissions, wherein there is at least one flag between at least two adjacent series of transmissions, wherein the at least one flag notifies the receiver side of a beginning or end of a transmission and of a continuous establishment of a communication link; and a data processing unit configured to determine an elapsed time during which at least one transmission is transmitted without data after a last transmission with data is transmitted and eliminate transmissions that are transmitted without data after the elapsed time until a first transmission with data is transmitted.

* * * * *